United States Patent
Sherman et al.

(10) Patent No.: US 7,940,757 B2
(45) Date of Patent: May 10, 2011

(54) SYSTEMS AND METHODS FOR ACCESS PORT ICMP ANALYSIS

(75) Inventors: Troy H. Sherman, San Jose, CA (US); Bradley Neil Dunsmore, Raleigh, NC (US); Kevin Roy McMenamy, Fremont, CA (US); Salah Nassar, Fremont, CA (US); Monica Dattatraya Joshi, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 863 days.

(21) Appl. No.: 11/361,012

(22) Filed: Feb. 23, 2006

(65) Prior Publication Data
US 2007/0195774 A1    Aug. 23, 2007

(51) Int. Cl.
*H04L 12/28* (2006.01)
(52) U.S. Cl. ...................................... 370/389
(58) Field of Classification Search ............ 370/389
See application file for complete search history.

(56) References Cited

U.S. PATENT DOCUMENTS

| 7,028,335 | B1* | 4/2006 | Borella et al. ............. 726/11 |
| 7,360,245 | B1* | 4/2008 | Ramachandran et al. ...... 726/13 |
| 2003/0007481 | A1* | 1/2003 | Wada et al. ............... 370/349 |
| 2004/0172464 | A1* | 9/2004 | Nag ....................... 709/223 |
| 2005/0004924 | A1* | 1/2005 | Baldwin ................... 707/100 |
| 2005/0021740 | A1* | 1/2005 | Bar et al. ................ 709/224 |
| 2005/0022017 | A1* | 1/2005 | Maufer et al. ............ 713/201 |
| 2005/0286530 | A1* | 12/2005 | Horikawa ................. 370/395.1 |
| 2006/0117058 | A1* | 6/2006 | Smith .................... 707/102 |
| 2007/0110053 | A1* | 5/2007 | Soni et al. .............. 370/389 |

* cited by examiner

*Primary Examiner* — Ayaz R Sheikh
*Assistant Examiner* — Hai-Chang Hsiung
(74) *Attorney, Agent, or Firm* — Schwegman, Lundberg & Woessner, P.A.

(57) ABSTRACT

Systems and methods perform analysis of ICMP packets received at a network device port to determine if the ICMP packet is valid and thus should be forwarded. One aspect of the systems and methods includes configuring a port to be a trusted port in which any type of ICMP message may be considered valid. For untrusted ports, the system analyzes the ICMP packet to determine if the packet is one that should be received on an untrusted port. A further aspect of the systems and methods includes analyzing the ICMP packet data to determine if packet addresses have been spoofed or altered.

17 Claims, 5 Drawing Sheets

SYSTEMS AND METHODS FOR ACCESS PORT ICMP ANALYSIS

TECHNICAL FIELD

This application relates to systems and methods to perform access port ICMP (Internet Control Message Protocol) analysis. In an example embodiment, a system and method may analyze (snoop) ICMP packets in a switch to determine further processing options.

BACKGROUND

From their inception, computer networks have grown in use and capability to the point where they millions of people either use or are affected by networks on a daily basis. Networks operate to communicate data from one point to another according to a particular network protocol. The Internet protocol is perhaps the most widely used network protocol in today.

In order to assist in assuring that data flows smoothly from one point to another, the ICMP (Internet Control Message Protocol) was developed to gather information, report error conditions, and set network routing parameters. When used properly, ICMP messages are a powerful mechanism to ensure that network data is communicated in a timely and efficient manner.

Unfortunately, the same messages that may be used to enhance network performance may be used by a malicious party to cause harmful affects to the network or a host on a network. Various forms of attacks using ICMP messages have been developed by malicious users. Many of the attacks involve the attacker generating spurious ICMP packets that can cause effects like terminating network connections. Further, the attacks may involve spoofing. In spoofing, the ICMP message data is altered in a way so that the packet appears to come from a source different than the true source of the message.

Other attacks can cause a system to reroute packets to an unintended location, either to attempt to overwhelm the unintended location with network traffic or to allow a malicious user to examine the data to attempt to glean information from the network data. An ICMP redirect related attack is such an attach and is based on an attacker generating a spoofed ICMP redirect packet to the host, requesting the use of a default gateway which could either lead to the packet being black-holed (lost forever) or redirecting all those packets to the attacker so that the attacker can examine these packets.

A source quench related attack is based on an attacker sending out source quench ICMP messages back to the source even in cases where there is no network congestion. For hosts that act on this type of message, this can compromise the quality of a TCP connection for cases where there is no real network congestion. One of the current methods of mitigating these attacks would be for end hosts to not respond to ICMP source quench messages.

There are several ICMP attacks related to the destination unreachable message. An attacker can create a spoofed packet with the port or protocol unreachable set and send this message to the sender. On receiving this message, the originating host typically terminates the TCP connection by treating this message as a hard error. This may cause a valid TCP connection to be unexpectedly (and invalidly) terminated.

Other types of attacks may use ICMP messages to cause a denial of service to a host. In this type of attack, a malicious user generates ICMP echo packets that result in the target host being flooded with great amounts of ICMP messages which will leave the attacked host and its associated network with degraded performance or even total denial of service in some instances.

Current mechanisms to prevent these types of attacks typically involve turning off ICMP messages related to the attack method. While this prevents the attack, it also prevents the system from gaining the benefits that the ICMP message was intended to provide.

BRIEF DESCRIPTION OF DRAWINGS

Embodiments are illustrated by way of example and not limitation in the figures of the accompanying drawings, in which like references indicate similar elements and in which.

DETAILED DESCRIPTION

In an example embodiment, a method and a system to process an ICMP network packet is described.

In the following detailed description of example embodiments, reference is made to the accompanying drawings which form a part hereof, and in which is shown by way of illustration specific embodiments in which the example method, apparatus and system may be practiced. It is to be understood that other embodiments may be utilized and structural changes may be made without departing from the scope of this description.

Figure 1:
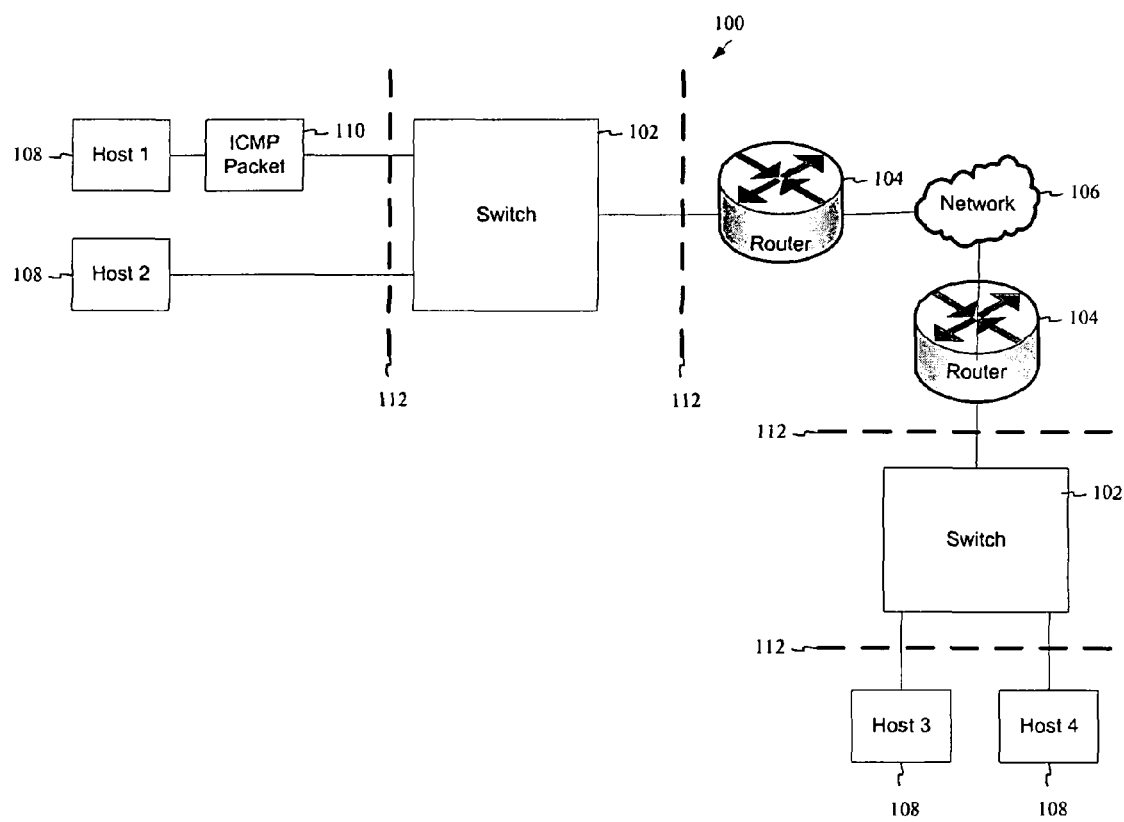
FIG. 1 shows major components of a system to perform access port ICMP analysis according to an example embodiment.

FIG. 1 shows major components of a system 100 to perform access port ICMP analysis according to an example embodiment. In an example embodiment, system 100 includes one or more switches 102, one or more routers 104, a network 106 communicably coupling routers 104, and one or more hosts 108 communicably coupled to switches 102. Network 106 may be any type of public or private network, including wide area networks (WANs), local area networks (LANs), corporate networks, intranets or other types of networks. In some embodiments, network 106 may be the Internet.

Router 104 is a device that forwards data packets along networks. A router is typically connected to at least two networks, commonly two LANs or WANs or a LAN and an Internet Service Provider's (ISP) network. Routers are typically located at places where two or more networks connect.

Routers may use ICMP to indicate information or error messages about network conditions about the network back to the originator of the datagram.

Switch 102 is a device that filters and forwards packets between network segments. A switch 102 may operate at the data link layer (layer 2) or the network layer (layer 3) of the OSI Reference Model. Further details on switch 102 are provided with reference to FIG. 2 below.

Host 108 is an endpoint with respect to network communication. Host 108 may be a personal computer, a server computer, a mainframe computer, a mobile computer such as a laptop or tablet computer, a network enabled personal digital assistant, a network appliance or any other device that may be connected to a network.

One or more of hosts 108 or routers 104 may issue one or more ICMP (Internet Control Message Protocol) packets 110. ICMP packets 110 typically contain data that supports error reporting, network control, and informational messages. Further details on ICMP packet 110 are provided below with reference to FIGS. 3A and 3B.

Trust boundaries 112 may be established using the systems and methods described in further detail below. A trust boundary 112 extends to a port (see FIG. 2) on a switch 102, and exists between the port and the device connected to the port. Thus the trust boundary 112 applies to a port, but not what is connected to the port. As shown in FIG. 1, trust boundaries may be established for multiple switches 102, thereby protecting the edges of network 106 and network device such as routers 104 on network 106. Establishing a trust boundary 112 around a network 106 is desirable, because doing so may prevent bad information or attacks from exiting within a core network such as network 106. Further details on the configuration of one or more switches 102 to establish trust boundaries 112 are provided below.

Figure 2:
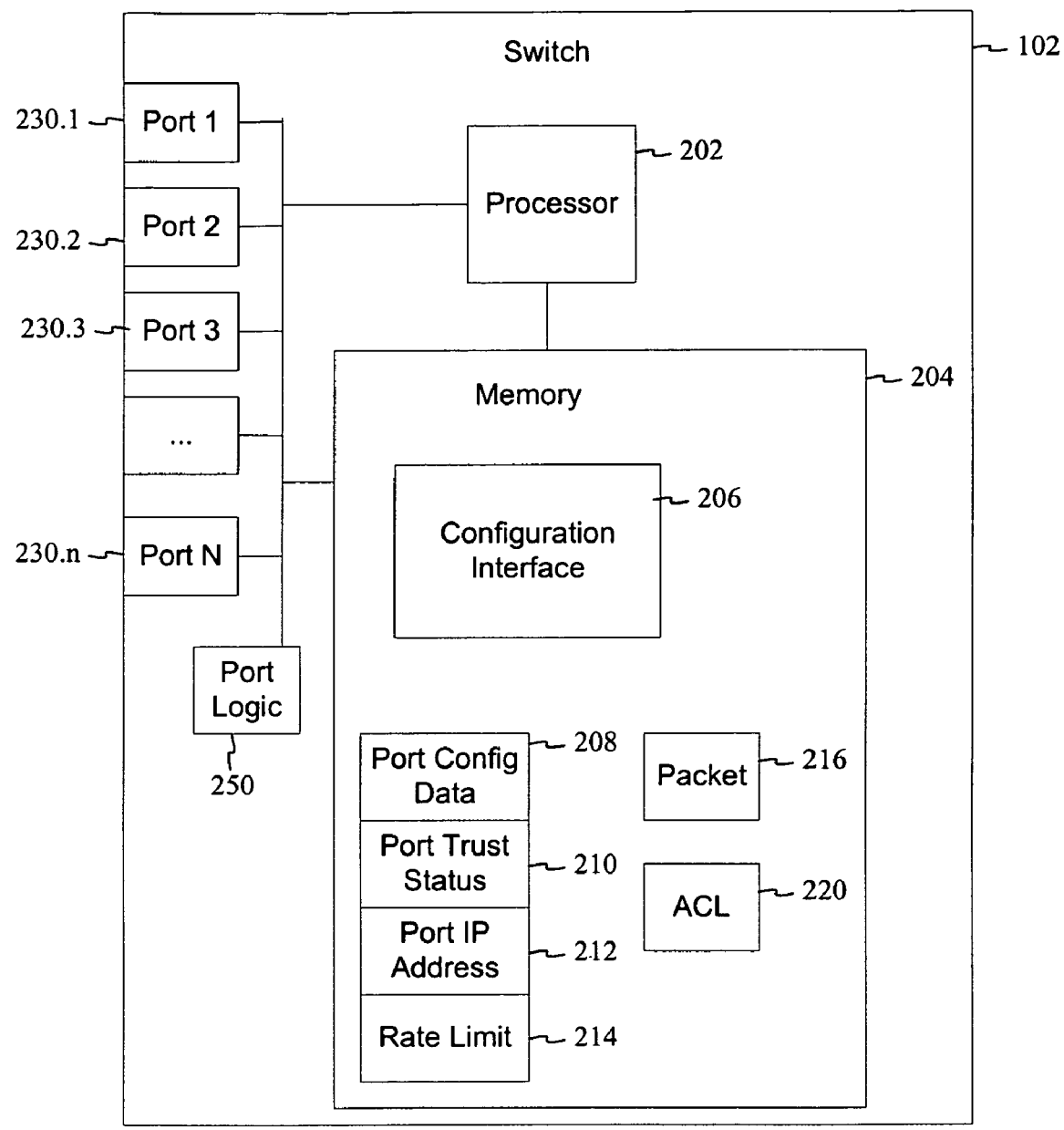
FIG. 2 shows a block diagram of a switch to perform access port ICMP analysis according to an example embodiment.

FIG. 2 shows a block diagram providing further details of a switch 102 to perform access port ICMP analysis according to an example embodiment. In an example embodiment, switch 102 includes a processor 202, a memory 204, and a plurality of ports 230. A port 230 includes a communications interface between switch 102 and other network devices such as host 108, router 104 or other switches 102. The port is typically adapted to receive a connector physically coupling the switch to a network media. For example, the port may be adapted to receive a jack to couple the switch to a network media. The network media may be an Ethernet based media such as a 10 megabit/second Ethernet, 100 megabit/second Ethernet, a gigabit/second Ethernet, or the like. The network media may be wired media or may be fiber optic media. In addition, port 230 includes logic to receive network data in the form of network packets.

As packets arrive at a port 230, they may be stored in memory 204. Memory 204 may be any type of machine-readable media, including RAM, ROM, flash memory, compact flash memory, hard drives, CD-ROM, DVD-ROM or other machine-readable media. It should be noted that although one memory 204 is shown, memory 204 may include various types and combinations of the memory types listed above.

In some embodiments, processor 202 reads a packet 216 from memory 204 and determines which port 230 should be used to forward the packet 216. The processor 202 typically reads network header data that provides a destination address for the packet. The switch 102 maintains data mapping a destination address to a port 230, and uses that data to determine the appropriate port for forwarding the packet. Processor 202 may be a general purpose processor, or it may be a specialized network processor. Although only one processor is shown, switch 102 may includes multiple processors. Additionally, switch 102 may include multiple combinations of general purpose and network processors.

Memory 204 may include port configuration data 208 for one or more of ports 230. In some embodiments, the configuration data that may be maintained on a port by port basis may include one or more of port trust status 210, port IP address 212 and rate limit 214. Port trust status 210 is a field that indicates whether or not the device connected through the port may be considered a trusted device. For example, a host such as a workstation or a personal computer is typically not considered a trusted device, because a malicious or inexperienced user may cause invalid ICMP packets to be generated that may cause harmful effects to other hosts on the network. However, a router may be considered to be a trusted host, because it is unlikely that a malicious user will be able to gain control of the router and cause it to issue invalid ICMP packets.

Port IP address 212 may be used to specify the IP address of a device that is connected to a port 230. The IP address may be configured or it may be learned by inspecting network traffic flowing through the port.

Rate limit 214 may be used to establish an upper bound on the ICMP packets that may flow through the port. The rate limit may be based on a counter, a time unit, or a combination of the two. For example, the rate limit may specify that only ten ICMP packets per second may be allowed through the port.

Access control list (ACL) 220 may be used to specify combinations of IP addresses and ICMP message types that may be sent through a port.

Memory 204 may also store a configuration interface 206. Configuration interface 206 may be used to set various parameters affecting the operation of the switch, including port configuration data 208. In some embodiments, configuration interface 206 may be a command line based interface used to interpret command lines received from a user. In alternative embodiments, the configuration interface may be a graphical user interface.

While FIG. 2 has been discussed in the context of a switch, other network devices having multiple ports such as routers, bridges, network interface cards etc. may be used and are within the scope of the inventive subject matter.

Further, it should be noted that in the above discussion, packets are processed by a processor 202 in memory 204. In some embodiments, processing may take place in logic 250 at a port of a switch, bypassing the processor and memory.

Figure 3A:
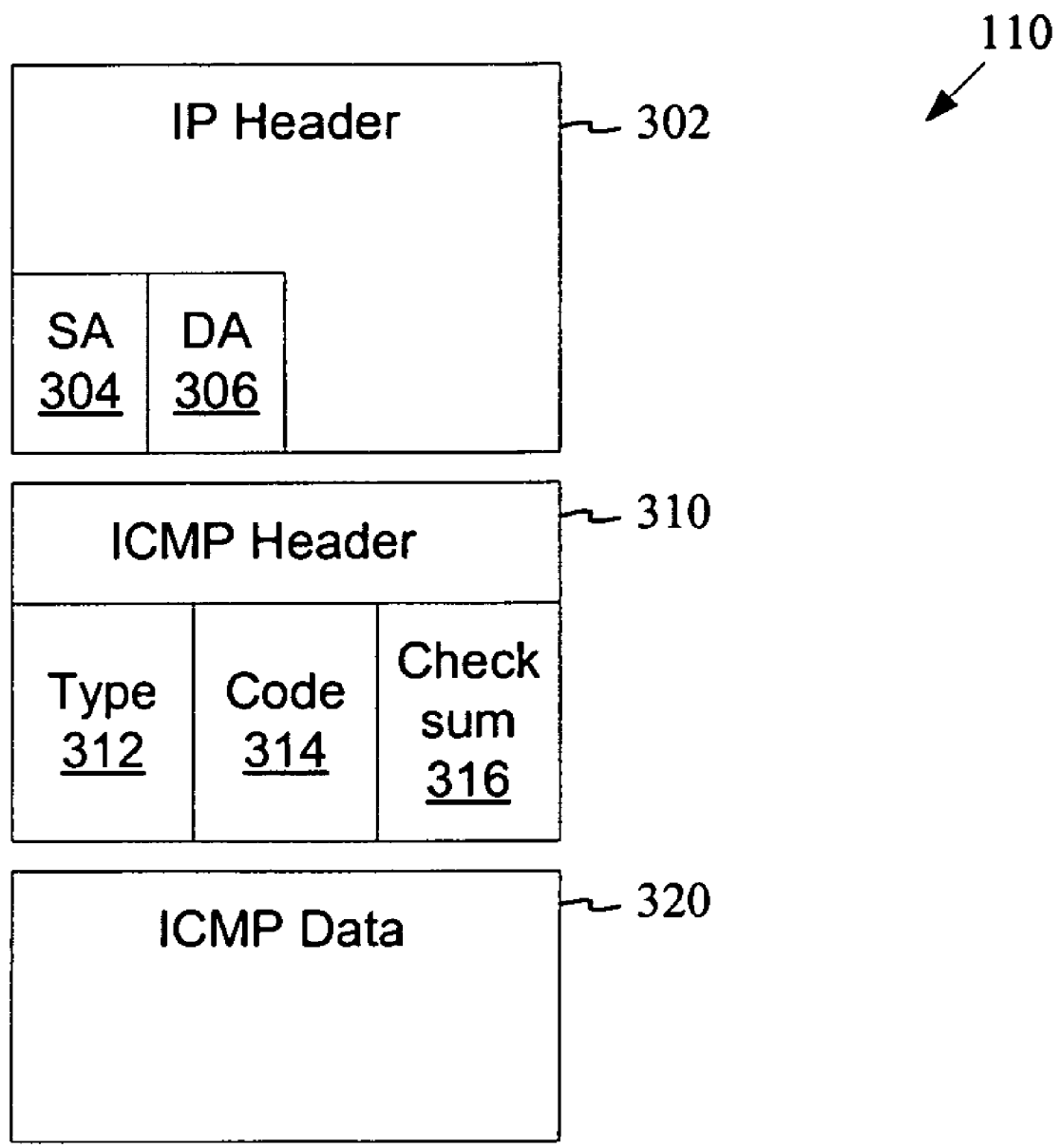
FIG. 3A shows a block diagram of an ICMP network packet processed by an example embodiment.

As noted above, switch 102 may be configured to operate in an IP-based network and receive ICMP packets at a port on the network. FIG. 3A shows a block diagram of an ICMP network packet 110 (see FIG. 1) processed by an example embodiment. In the example embodiment, ICMP network packet 110 includes an IP header 302, ICMP header 310 and may optionally include ICMP data 320.

IP header 302 contains fields defined per RFC 791 published by the Internet Engineering Task Force (IETF). In particular, IP header 32 includes a source address field 304 and a destination address field 306. Source address field 304 provides the IP address of the host that sent the packet. Destination address 306 provides the IP address of the host that is to receive the packet 110. In order to avoid obscuring the description of the embodiments, not all fields of IP header 302 have been described in FIG. 3A. It should be noted that a new version of IP, IPv6 is currently being defined, and is within the scope of the described embodiments.

ICMP header 310 includes fields defined per RFCs 792 and 950 published by the IETF. ICMPv6 is defined by RFCs 2461 and 2463, also published by the IETF. In particular, ICMP header 310 includes type 312, code 314, and checksum 316. Again, to avoid obscuring the description, not all fields of ICMP header 310 are described in FIG. 3A.

Type 312 contains the ICMP type of the packet. Various types exist, and include "destination unreachable", "echo", "source quench", "redirect" and others.

Code 314 may be used to differentiate within an ICMP type 312. Some types only have a single code, while others have several codes that can be used. For example, the ICMP Destination Unreachable (type 3) can have at least code 0, 1, 2, 3, 4 or 5 set. Each code may a different meaning in the context of the type.

Checksum 316 is a 16 bit field containing a one's complement of the one's complement of the headers starting with the ICMP type and down. While calculating the checksum, the checksum field is typically set to zero.

ICMP data 320 may contain data that is used by a particular type and code combination.

Figure 3B:
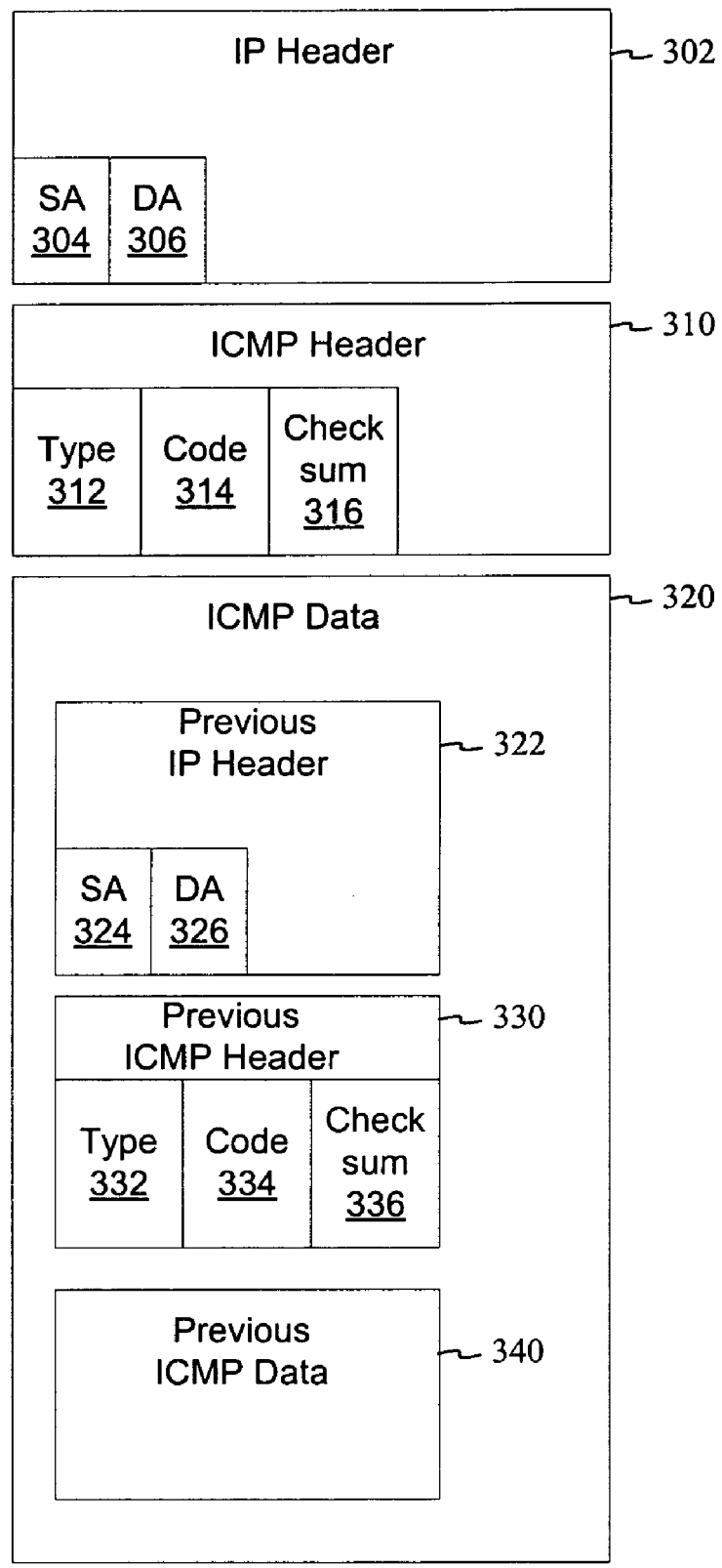
FIG. 3B shows a block diagram of an alternative form of an ICMP network packet processed by an example embodiment.

FIG. 3B shows a block diagram of an alternative form of an ICMP network packet 110 processed by an example embodiment and provides further details regarding the use of ICMP data 320 for particular ICMP types. Some ICMP types may be used to report error conditions or other information regarding the network. For these types, ICMP data 320 may include up to 64 bytes of data for a previously issued ICMP packet. In these cases, ICMP data 320 may include previous IP header 322, previous ICMP header 330 and a portion of the data of the original ICMP payload data 340 in the message that generated the datagram. In some embodiments, the portion comprises eight bytes of data. Like IP header 302, previous IP header 322 includes a source address 324 and a destination address 326. Similarly, previous ICMP header 330 will contain a type 332, a code 334, and a checksum 336.

Figure 4:
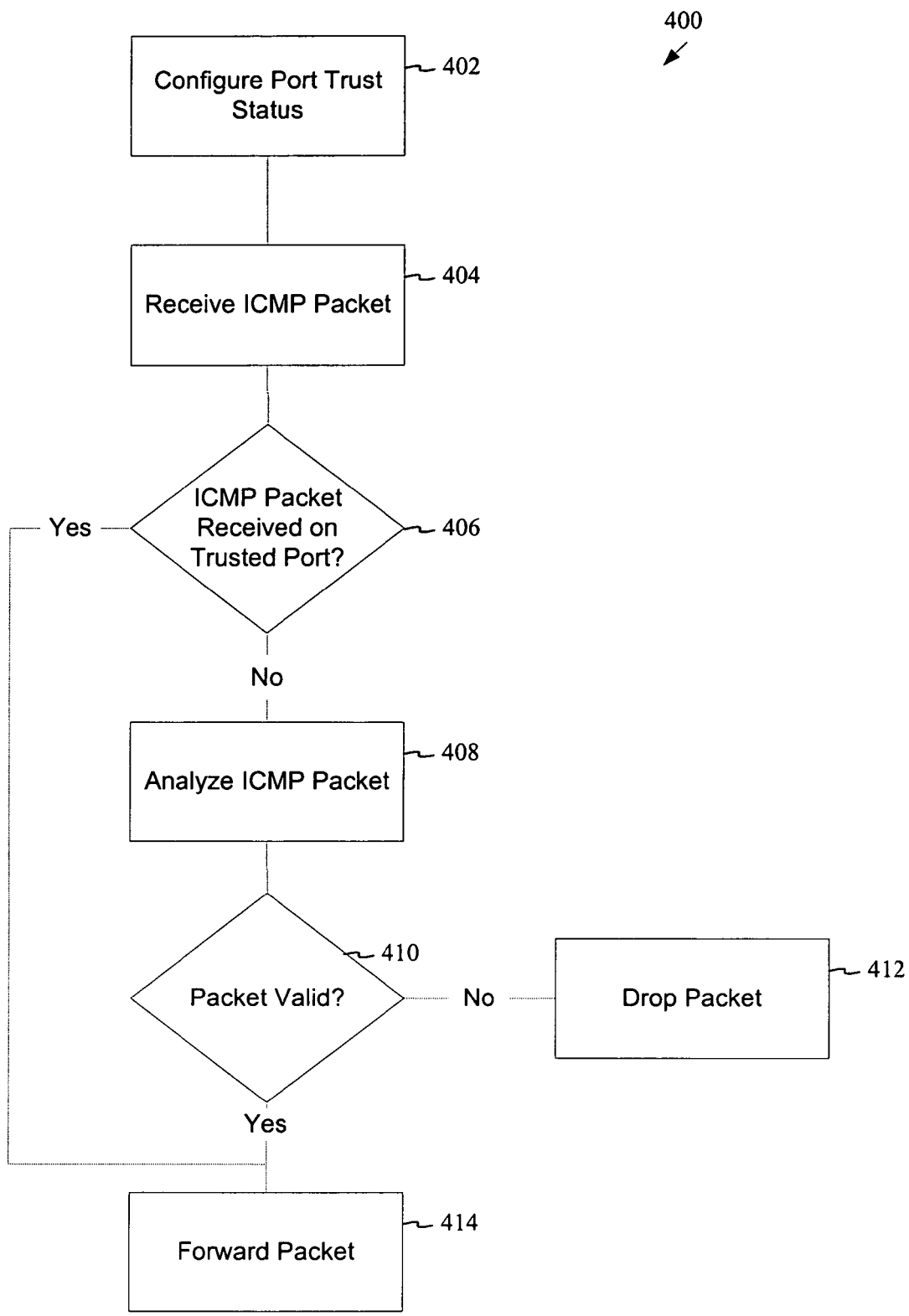
FIG. 4 shows a flow diagram of a method for processing an ICMP network packet according to an example embodiment.

FIG. 4 shows a flow diagram of a method 400 for processing an ICMP network packet according to an example embodiment. The method 400 may be performed by switch 102 operating on an ICMP packet 110 as described above. The method may begin by configuring a port trust status (block 402). As noted above, a configuration interface may be used to configure a port trust status for a port. The port trust status may be a yes/no or true/false value to indicate whether or not the port is connected to a trusted device. Alternatively, other values may be used to indicate a level of trust.

Next, the switch receives an ICMP packet on a first switch port (block 404). The ICMP packet may be an IPv4 ICMP packet, or an IPv6 ICMP packet.

The switch then determines if the port receiving the packet is a trusted port (block 406). If so, the switch then forwards the packet as specified in the packet headers (block 414).

Otherwise, if the packet is received on a port that is not configured as a trusted port, the switch then proceeds to analyze the ICMP packet to determine if the ICMP packet is valid (block 408). Various methods may be used to determine if the packet is valid. In an example embodiment, the switch examines the ICMP packet type to determine what type of packet has been received. If the packet is one that is limited solely to trusted ports, the switch may proceed to determine the packet is invalid. An example of a message that may be valid only on a trusted port is the ICMP redirect messages that may cause packets to be redirected to another host. Such packets are typically only generated by a router, and are therefore invalid if received from a port not connected to a router (an untrusted port).

In some cases, an ICMP message may be received on an untrusted port that may be valid. For example, an ICMP source quench message type directs the receiver to reduce the number of packets sent to the network device issuing the source quench message. This type of message may be sent by either a router or a host that is becoming overwhelmed with network data. In this case, the switch analyzes the ICMP packet data (also referred to as the "payload"). The analysis typically comprises checking that the previous destination address 326 in the ICMP packet data 320 matches the current source address 304 in IP header 302.

A similar check may be performed for certain types of ICMP "destination unreachable" messages. Like the source quench message, certain ICMP codes for this message may be valid on both routers and host devices. For those destination unreachable messages that may be received from either a host or a router, the switch determines whether or not the message is valid by checking that the previous destination address 326 in the ICMP packet data 320 matches the current source address 304 in IP header 302. If they match, the switch determines that the ICMP message has not been spoofed and that the message is therefore valid.

It should be noted that in some embodiments, even if an ICMP packet comes in on a trusted port, the switch may still perform anti-spoofing checks on the ICMP packet data. In these embodiments, the system checks to make sure that the previous source address 324 in the ICMP packet data 320 matches the current destination address 306 in IP header 302. If there is a match, the ICMP packet is considered valid.

If the ICMP destination unreachable message has a code that indicates it should be received only from a router, the packet is considered invalid if received on an untrusted port.

Additionally, if the ICMP message indicates that fragmentation (breakup of large packets into smaller units) is needed, but the "do not fragment" flag is set in the IP header, the system may indicate that the packet is invalid unless received on a trusted port.

After the checks described above have been made, the switch can then determine if the packet is valid (block 410). If the packet is valid, the packet may be forwarded on to the destination port associated with the IP destination address in the IP header (block 414).

Otherwise, if the ICMP packet is invalid, it may be dropped (block 412). It should be noted that other activity may take place in addition to dropping the packet. For example, the invalid packet may be logged in an event log, or an alert may be generated to management interface for the switch.

It should also be noted that other types of attack prevention schemes may be combined with method 400 above. For example, in those embodiments where an ACL is defined, the switch may check to make sure that there is an ACL that matches on ICMP fields like type/code etc. In the case where there is an ACL configured on an interface, the ACL may take precedence over the ICMP analysis of method 400. If a packet is denied by an ACL, then the packet should be dropped in hardware and not forwarded further inspection provided in method 400.

Similarly, rate limiting may be combined with method 400 in some embodiments. Here if the number of ICMP packets analyzed by the switch exceeds the rate limit, the switch proceeds to throttle the number of ICMP packet analyzed in order to prevent the processor (or processors) from becoming overwhelmed, for example during a denial of service attack (DoS) on the switch itself.

EXAMPLE OPERATION

As noted above, various forms of ICMP based attacks may be directed at network devices. This section provides examples of various attacks and the defenses to the attacks provided by varying embodiments incorporating the systems and methods described above.

ICMP Redirect Attack

An ICMP redirect message is intended to be sent by a router to a host if there is a more optimum path for the host via another router. The redirect message advises the host to send its traffic for a network directly to a gateway on the belief that it is a shorter path to a destination than the currently defined path. An ICMP redirect related attack is based on an attacker generating a spoofed ICMP redirect packet to the host, requesting the use of a default gateway which could either lead to the packet being blackholed or redirecting all those packets to the attacker so that the attacker can examine these packets.

ICMP redirects use the ICMP type of 5 and codes that range in values from 0 to 3 to redirect packets for networks, hosts and Type of Service (ToS) fields. The ICMP payload of this message contains the gateway address where the host should send packets to the IP header of the original packet that was sent by the host which caused the ICMP redirect to be generated.

Various embodiments use the systems and methods described above to prevent these types of attacks by allowing a port to be configured to only accept ICMP redirect packets (identified by type 5) on trusted interfaces. In such embodiments, redirect packets are not sent to hosts if the packets are received on untrusted interfaces on the switch. This may prevent DoS attacks from being launched on untrusted ports.

Even on trusted interfaces, some embodiments may be configured to ensure that source IP address that is present in the ICMP payload (the sender of the original packet that caused the generation of the ICMP redirect) matches the IP destination address in the IP header of the ICMP packet. In the case that the original IP header of the ICMP payload is not constructed correctly, this check could fail leading to the suspect packet being dropped in various embodiments.

Further, these types of attacks typically are launched by attackers on the same subnet as the victim since the hosts typically check if the new gateway that the redirect message advertises is on the same subnet as the current default gateway. If the spoofed ICMP packet is not using the attackers IP address as the IP source address in the redirect packet (uses some other default gateway address), various embodiments catch these types of spoofed frames and prevent them from being sent to an attacked host.

ICMP Source Quench Attack

ICMP source quench messages are generated either by the receiving host or an intermediate gateway to indicate that it can not keep up with the TCP connection and that the sending side needs to throttle the connection. These messages use the type 4 and code 0. The ICMP source quench message contains the original IP header that generated the source quench message and also the first 64 bits of the original IP datagram.

In some embodiments, ICMP source quench messages are allowed on trusted interfaces. On untrusted interfaces, some embodiments verify that the IP source address in the ICMP source quench message matches the IP destination address in the original IP header that is present in the ICMP payload. If these do not match, then the ICMP source quench message could be spoofed and is dropped.

These checks can prevent ICMP source attacks that are generated on the local subnet. Also, if there are any untrusted interfaces that are receiving ICMP packets from a gateway, then these packets would get dropped since they would fail the anti-spoofing checks that are performed on untrusted ports.

In particular embodiments, ICMP source quench requests are not processed unless these requests are generated in response to an ICMP echo request.

ICMP Destination Unreachable

The ICMP destination unreachable message is generated by either end hosts or intermediate routers if an IP datagram can not be delivered to or processed by the final destination of the IP datagram. Routers typically generate the network or host unreachable messages in the case where the router needs to drop packets for an end-host due to various reasons. A router can also generate the "fragmentation needed but DF bit set" message back to the host for the case the MTU (Maximum Transmission Unit) size of the datagram can not be supported by the router. End hosts that are the intended recipients of an ICMP message can generate the port or protocol unreachable message if the packet can not be processed at layer 4.

There are a few ICMP attacks related to the destination unreachable message. An attacker can create a spoofed packet with the port or protocol unreachable set and send this message to the sender. On receiving this message, the originating host typically terminates the TCP connection by treating this message as a hard error. This could cause a valid TCP connection from being terminated.

Another attack on this type is related to the fragmentation needed but DF set attack. Tunnel path MTU discovery is vulnerable to an ICMP DOS attack. By creating an ICMP packet (type 3 code 4—fragmentation needed and DF set) with a very small next hop size, and sending this packet to the tunnel head end, the tunnel head end will reduce the tunnel MTU to the specified small size. Tunnel data throughput will be drastically reduced.

The destination unreachable message has a type of 3 and various codes. The ICMP codes provide more information about why the datagram could not be delivered. Routers generate the ICMP codes of 0 (network unreachable), 1 (host unreachable), 4 (fragmentation needed but DF set) and 5 (source route failed). The codes 2 and 3 (port or protocol unreachable) would be generated by the receiving host. The ICMP unreachable message contains the original IP header and the first 64 bits of the IP datagram that caused the ICMP unreachable message to be generated.

In some embodiments, all the destination unreachable packets would be allowed and not checked on trusted interfaces. On untrusted interfaces, for any ICMP destination unreachable packets that are received, if the ICMP code type is set to 2 or 3 which is the port or protocol unreachable, the IP source address in the ICMP unreachable packet is compared against the IP destination address in the original IP header that is present in the ICMP payload. If these addresses do not match, then the ICMP packet may be dropped. All other codes that are received from routers like the network/host unreachable and the DF and source route failed may be dropped on untrusted ports.

Alternative embodiments perform the same check for ICMP unreachable port and protocol code messages that are performed on untrusted ports on the trusted interfaces to prevent these types of ICMP attacks from outside the local subnet. These checks can prevent known ICMP DoS attacks that are related to attackers generating port or protocol unreachable packets that can reset valid TCP connections. These attacks can be prevented if they are launched on the local subnets by the checks that are performed on untrusted ports. If these checks are also performed on trusted interfaces, these types of attacks may be prevented if launched from outside a subnet.

As noted above, there are ICMP attacks that are related to sending packets with the "fragmentation needed but DF bit set" that are typically used for reducing the throughput of tunnels and also affect Path MTU discovery. These attacks, if launched on untrusted ports, can be prevented since these packets are dropped on untrusted ports. The assumption is that the fragmentation needed ICMP messages are only generated by routers and that the untrusted ports do not have any routers configured.

IRDP Message Attacks

IRDP is a protocol that provides a mechanism for router discovery for IPv4 routers by sending Router Advertisement messages. Since there is no good way to verify that this message is indeed sent by a router and not some attacker that is pretending to be a router, this protocol is susceptible to man in the middle type of attacks. A typical attack scenario is as follows:

Step 1. Host boots up and issues a "router solicitation" message to find out the default router on the network.

Step 2. Attacker listens in to the message and spoofs a reply to that host.

Step 3. The default route of the host is now set to the attacker's IP address that the attacker has included in his reply.

Step 4. Now the attacker could employ either sniffing, man-in-the-middle attack for all traffic outbound through the attacker's machine.

Step 5. Denial of service attack is also possible by not forwarding any packets onto the correct subnet. The success of this type of attack depends on the way in which the host processes the router advertisement messages and the type of validation it does on these messages.

A further example of an attack is as follow: If a Windows system is configured as a DHCP client, any router advertisement will be accepted and processed. Once an advertisement is received, Windows checks to see how many gateway entries the packet contains. If the packet contains only one entry, it checks to make sure the IP source address of the advertisement is inside its own subnet. If it is, the router address entry inside the advertisement is checked to see that it also is within the subnet. If so, a new default route entry is added. If the address is outside the subnet, the advertisement is silently ignored. However, if the router advertisement contains two or more router addresses, the host will process the packet even though the IP source address is not local. If the host finds a router address inside the advertisement that is inside the host's subnet, it will add a default route entry for it. Because the host does not care about the IP source address of the advertisement as long as it has more than one entry, attackers can create bogus IRDP packets that will bypass anti-spoofing filters. Also, in the case of a single IP source address, it could still be possible to launch such an attack from within the same layer 2 domain, since the attacker could belong to the same subnet.

Thus IRDP messages are typically sent by attackers that are pretending to be routers by sending router advertisement messages as routers. In some embodiments, these types of attacks may be prevented by only accepting these packets on trusted interfaces. If the packets are received on any other interfaces, the frames may be dropped. This can prevent ICMP attacks that can be launched on the same subnet.

ICMP Ping Attacks

There are several attacks that are related to sending ICMP echo packets. The general idea is to flood the target host with great amounts of ICMP messages which will leave the attacked host and its associated network with degraded performance or even total denial of service in some instance.

Smurf attacks are one example of this. These attacks use whole networks of computers to direct an overwhelming amount of traffic to a victim's machine and its network. A smurf attack is illustrated below:

Step 1. Attacker finds some intermediary network that will respond to the network's broadcast address.

Step 2. Attacker spoofs the IP address of the victim host and sends a great number of ICMP echo request packets to the broadcast address of the above intermediary networks.

Step 3. Now all the hosts on that network will respond to that ICMP echo request with a corresponding ICMP reply request back to the spoofed IP address (the victim).

Step 4. This will send a whole bunch of ICMP echo replies to the victim and its network thus causing network degradation or a total denial of service.

There are two parties that may be harmed by this attack: the intermediary (broadcast) devices and the spoofed address target, the victim machine. The victim is the target of a large amount of traffic the broadcast devices generate. The initiators of these attacks rely on the ability to "source spoof" traffic to the intermediary broadcast networks in order to generate the traffic which causes denial of service.

To deter this attack, some embodiments may perform source address checks either at the edge of the network where users connect or at the edge of the network with connections to the Internet.

Additionally, in various embodiments, these types of attacks can be prevented by enabling throttling of ICMP packets on network device ports. This can prevent a target victim from being overwhelmed with these types of frames.

It should be noted that the attacks described above are examples of some type of possible attacks. Other attacks are possible and variations of the above attacks are possible. The embodiments may respond to such attacks using the systems and methods described above.

The embodiments described herein may be implemented in an operating environment comprising software installed on any programmable device, in hardware, or in a combination of software and hardware. The software may be provided on a machine readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media. Such medium may also include, without limitation, hard disks, floppy disks, flash memory cards, digital video disks, random access memory (RAM), read only memory (ROMs), and the like.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method to process a network control packet, the method comprising:

receiving an ICMP (Internet Control Message Protocol) packet at a first port, wherein the ICMP packet includes a packet data block and a packet header, the packet header specifying an ICMP type, the packet data block comprising a previous internet protocol (IP) header;

comparing a previous destination address in the previous IP header of the packet data block with a current source address in the packet header;

determining whether the ICMP packet is authentic based on the current source address matching the previous destination address; and based on the determining, forwarding the ICMP packet through a second port if the ICMP packet is an authentic ICMP packet, and dropping the ICMP packet if the ICMP packet is an unauthentic ICMP packet.

2. The method of claim 1, wherein the trust status indicates a trusted device is communicably coupled to the first port.

3. The method of claim 1, wherein analyzing the ICMP packet includes determining if the ICMP packet exceeds a rate limit of the first port.

4. The method of claim 1, further comprising comparing the ICMP packet to an access control list (ACL).

5. The method of claim 1 wherein the authentic ICMP packet is an ICMP packet that has not been spoofed or altered.

6. A device comprising:
  a plurality of ports, including at least a first port and a second port, the first port operable to receive an ICMP packet, wherein the ICMP packet includes a packet data block and a packet header, the packet header specifying an ICMP type, the packet data block comprising a previous internet protocol (IP) header;
  a memory operable to store the ICMP packet; and
  a processor operable to:
    compare a previous destination address in the previous IP header of the packet data block with a current source address in the packet header;
    determine whether the ICMP packet is authentic based on the current source address matching the previous destination address; and
    forward the ICMP packet through a second port if the ICMP packet is an authentic ICMP packet, and dropping the ICMP packet if the ICMP packet is an unauthentic ICMP packet.

7. The device of claim 6, wherein the trust status is operable to store a value indicating a router is communicably coupled to the first port.

8. The device of claim 6, wherein the processor is operable to determine if the ICMP packet exceeds a rate limit of the first port.

9. The device of claim 6, wherein the memory is operable to store an access control list and the processor is operable to compare the ICMP packet to the access control list.

10. An apparatus to process an ICMP packet, the apparatus comprising:
  means for receiving an ICMP (Internet Control Message Protocol) packet at a first port, wherein the ICMP packet includes a packet data block and a header, the header specifying an ICMP type, the packet data block comprising a previous internet protocol (IP) header;
  means for comparing a previous destination address in the previous IP header of the packet data block with a current source address in the packet header;
  means for determining whether the ICMP packet is authentic based on the current source address matching the previous destination address; and
  based on the determining, means for forwarding the ICMP packet through a second port if the ICMP packet is an authentic ICMP packet, and dropping the ICMP packet if the ICMP packet is an unauthentic ICMP packet.

11. The apparatus of claim 10, wherein the means for receiving the ICMP packet comprises a switch port.

12. The apparatus of claim 10, wherein the means for comparing the previous destination address in the previous IP header of the packet data block with the current source address in the packet header comprises a general purpose processor.

13. The apparatus of claim 10, wherein the means for comparing the previous destination address in the previous IP header of the packet data block with the current source address in the packet header comprises a network processor.

14. A non-transitory machine-readable medium embodying instructions which, when executed by a machine, causes the machine to perform operations to process ICMP packets, the operations comprising:
  receiving an ICMP (Internet Control Message Protocol) packet at a first port, wherein the ICMP packet includes a packet data block and a packet header, the packet header specifying an ICMP type, the packet data block comprising a previous internet protocol (IP) header;
  comparing a previous destination address in the previous IP header of the packet data block with a current source address in the packet header;
  determining whether the ICMP packet is authentic based on the current source address matching the previous destination address; and
  based on the determining, forwarding the ICMP packet through a second port if the ICMP packet is an authentic ICMP packet, and dropping the ICMP packet if the ICMP packet is an unauthentic ICMP packet.

15. The non-transitory machine-readable medium of claim 14, wherein the trust status indicates a router is communicably coupled to the first port.

16. The non-transitory machine-readable medium of claim 14, wherein analyzing the ICMP packet includes determining if the ICMP packet exceeds a rate limit of the first port.

17. The non-transitory machine-readable medium of claim 14, wherein the steps further comprise comparing the ICMP packet to an access control list (ACL).

* * * * *